United States Patent [19]
King

[11] 3,781,643
[45] Dec. 25, 1973

[54] DC TO AC INVERTER

[76] Inventor: John F. King, 1882 Yolanda Ave., Springfield, Oreg. 97477

[22] Filed: May 30, 1972

[21] Appl. No.: 257,822

[52] U.S. Cl. .................. 321/45 C, 331/113.1 S
[51] Int. Cl. ............................ H02m 7/52
[58] Field of Search............. 321/9, 10, 44, 45 C, 321/49; 331/113.1 S

[56] References Cited
UNITED STATES PATENTS

| 3,273,076 | 9/1966 | Wilting | 321/44 |
| 3,328,721 | 6/1967 | Hehenkamp et al | 321/44 |
| 3,631,330 | 12/1971 | King | 321/45 C |
| 3,263,153 | 7/1966 | Lawn | 321/45 C |

Primary Examiner—Gerald Goldberg
Attorney—Eugene M. Eckleman

[57] ABSTRACT

In a static DC to AC inverter, one terminal of a source of direct current is connected through a pair of gate-controlled rectifiers to the opposite ends of a transformer primary winding the center tap of which is connected to the other terminal of the direct current source. Commutating capacitance is connected across the gate-controlled rectifiers, and tank or oscillation capacitance is connected across the transformer primary winding to form LC resonant tank circuits for converting the direct current pulses to alternating current.

4 Claims, 4 Drawing Figures

DC TO AC INVERTER

BACKGROUND OF THE INVENTION

This invention relates to DC to AC inverters, and more particularly to a static inverter of simplified construction and efficient operation.

Static inverters have been provided heretofore in a wide variety of circuit configurations. Generally, they are characterized by complex and costly constructions. Moreover, their operation generally is attended by high amplitude stray pulses, resulting in excessive heat and consequent component breakdown, and also undesirable electrical interferences in electrical equipment served by and in proximity to the inverter.

SUMMARY OF THE INVENTION

In its basic concept, the inverter of this invention utilizes the primary winding of an output transformer in association with one or more capacitors to form LC resonant tank circuits, producing a sine wave output across the secondary winding of the output transformer.

It is by virtue of the foregoing basic concept that the principal objective of this invention is achieved; namely, to overcome the aforementioned disadvantages of prior static inverters.

The foregoing and other objects and advantages of this invention will appear from the following detailed description, taken in connection with the accompanying drawing of preferred embodiments.

DESCRIPTION OF THE PREFERRED EMBODIMENT

Figure 1:
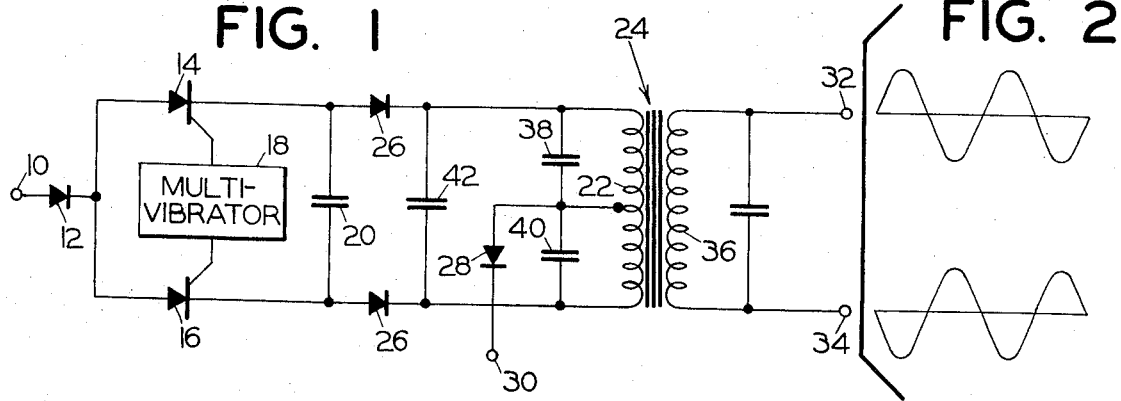
FIG. 1 is a schematic electrical diagram of a static inverter embodying the features of this invention.

In the embodiment illustrated in FIG. 1, one terminal 10 of a source of direct current is connected, preferably through a noise suppression diode 12, to a pair of gate-controlled rectifiers 14 and 16. In the illustrated embodiment, the terminal 10 is the positive terminal of the direct current source and it is connected through the suppression diode to the anodes of a pair of silicon controlled rectifiers. The gate electrodes are connected to a source of gating signals, such as the multivibrator 18 illustrated.

The cathodes of the silicon controlled rectifiers are connected together through a commutating capacitor 20 which functions in well known manner. Further, the cathodes are connected one to each of the opposite ends of the primary winding 22 of an output transformer 24. These connections preferably are made through isolation diode rectifiers 26 arranged to prevent the application of reverse current to the silicon controlled rectifiers.

A center tap on the primary winding is connected, preferably through a suppression diode rectifier 28, to the opposite terminal 30 of the direct current source. In the illustrated embodiment, this terminal is the negative, or ground terminal.

Figure 2:
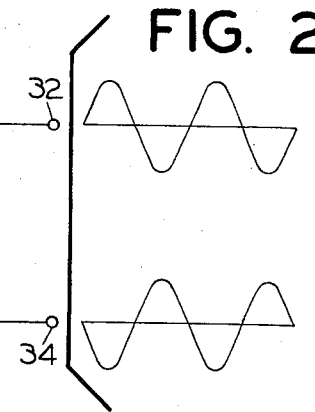
FIG. 2 is a graphic illustration of the output waveforms at the output terminals of the transformer secondary.

An important feature of this invention resides in the utilization of the primary winding of the output transformer as the inductance component of a pair of LC resonant circuits, which function to produce at the terminals 32 and 34 of the secondary winding 36 the sine wave outputs illustrated in FIG. 2.

Thus, in the embodiment illustrated in FIG. 1, a pair of capacitors 38 and 40 are connected between the opposite ends of the primary winding and the common center tap, to provide the capacitance component of the LC tank circuits. A wave stabilizing capacitor 42 is connected across the LC tank circuits, to dampen stray oscillations. This capacitor may be omitted if the LC capacitors 38 and 40 are perfectly matched. On the other hand, the use of the wave stabilizing capacitor also permits the use of less precise and therefore less costly LC capacitors. Although the use of less precise LC capacitors together with the wave stabilizing capacitor 42 results in a slight flattening of the crown of the output sine waveforms, the resulting voltage loss is insignificant.

Figure 3:
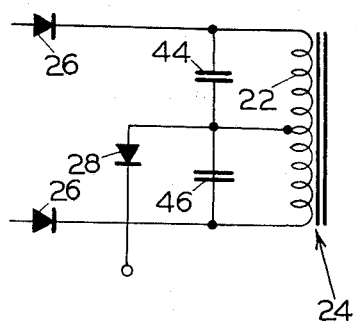
FIGS. 3 and 4 are partial schematic electrical diagrams of alternative forms of LC tank circuits for use in the inverter shown in FIG. 1.

FIG. 3 illustrates an alternative form of LC tank circuit wherein the capacitors 44 and 46 are perfectly matched, thereby eliminating the need of the wave stabilizing capacitor 42 in FIG. 1.

Figure 4:
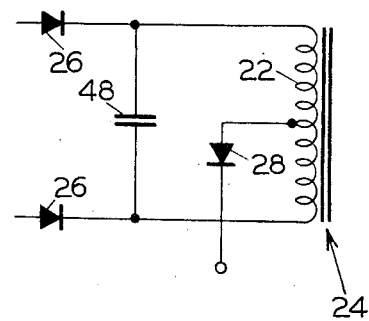

FIG. 4 illustrates a further alternative form of LC tank circuit wherein the pair of capacitors of FIG. 3 are replaced by a single, precision capacitor 48 connected across the primary winding.

It will be understood that an input voltage regulator may be utilized with the inverter, if required. Further, additional filtering may be provided between the transformer secondary and the load, as desired.

From the foregoing it will be appreciated that the present invention provides a static inverter of simplified construction. Moreover, the utilizing of the primary winding of the output transformer to form a pair of LC resonant tank circuits, results in the development of a sine wave output which is substantially completely free of stray peaks and high pulses. Accordingly, the inverter operation is highly efficient, being characterized by the absence of undesirable electrical interferences and the absence of development of excessive heat. In this latter respect, the inverter may be constructed in small, compact form for most effective utilization in a wide variety of applications. It operates equally well with no load, or under maximum load, whether inductive or resistive, or both.

It will be apparent to those skilled in the art that various changes may be made in the size, type, number and arrangement of components described hereinbefore. For example, the polarity connections of the direct current source may be reversed, by reversing the diodes. Although the transformer arrangement illustrated provides for voltage doubling, other magnitudes of output voltage may be afforded by appropriate changes in transformer values, as will be understood. These and other changes and modifications may be made without departing from the spirit of this invention.

I claim:

1. A DC to AC inverter, comprising:
   a. an output transformer having a primary winding,
   b. means connecting a center tap on the primary winding to one terminal of a source of direct current, c. capacitance means connected across the primary winding and forming therewith a pair of LC resonant circuits,
d. a pair of gate-controlled rectifier means connecting the opposite ends of the primary winding to the other terminal of the source of direct current,
e. commutating capacitance means connected across the pair of rectifier means, and
f. current isolation means between each LC resonant circuit at each end of the primary winding and the associated commutated gate-controlled rectifier means for preventing application of reverse current to the latter.

2. The inverter of claim 1 wherein the LC capacitance means comprises a single capacitor.

3. The inverter of claim 1 wherein the LC capacitance means comprises a pair of capacitors connected between opposite ends of the primary winding and the center tap thereof.

4. The inverter of claim 3 including wave stabilizing capacitance means connected across the pair of LC resonant circuits.

* * * * *